March 20, 1962
S. A. NORRIS, JR
3,025,697
METHOD AND APPARATUS FOR TESTING THE
SEALING CLEARANCE IN VALVES
Filed March 7, 1958
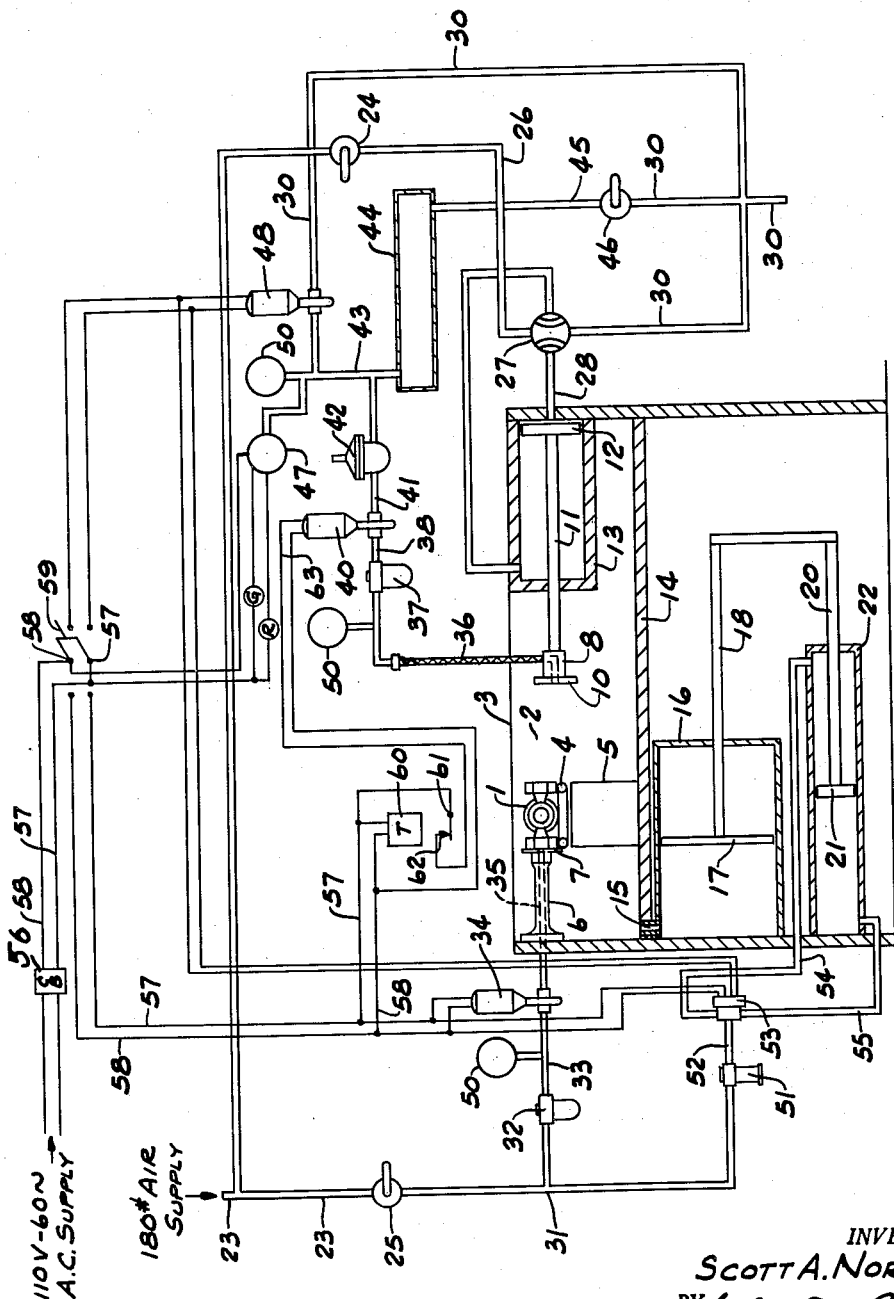
INVENTOR.
SCOTT A. NORRIS, JR.
BY
HIS ATTORNEY

# 3,025,697
METHOD AND APPARATUS FOR TESTING THE SEALING CLEARANCE IN VALVES Scott A. Norris, Jr., Ross Township, Allegheny County, Pa., assignor to Homestead Valve Manufacturing Company, Coraopolis, Pa., a corporation of Pennsylvania
Filed Mar. 7, 1958, Ser. No. 719,861
12 Claims. (Cl. 73—46)

This invention relates generally to the testing of valves and more particularly to the testing of of the sealing clearance in a closed valve.

Valves when assembled and ready for shipment are tested for leakage and if they are the type that require a lubrication the lubricant has been added before test. Valves that do not require lubricant are readily checked as their sealing clearance either passes the fluid intended to be controlled by such valve and is rejected or it shows no passage whatsoever and thus passes the test.

Lubricated type valves provide another story. If they are filled with lubricant before testing such test will show whether or not the valve leaks but it will not show the magnitude of the seal clearance sealed by lubricant. If seal clearance is too great the valve will eventually leak since the viscosity or body of the lubricant is not sufficient to withstand the continuous application of pressure exerted by the medium being controlled by the valve and will allow the medium to seek a path through the lubricant. If it has a sealed clearance below a given amount the lubricant can be depended upon to continue the valve in good service.

This problem is solved by the present invention by comparing the seal clearance throughout the valve as a fixed or predetermined orifice that will allow the flow of a given amount of fluid therethrough in a predetermined period of time. Thus, if an assembled and closed valve without lubricant will allow a limited amount of fluid under pressure to pass therethrough and accumulate and the amount of this accumulation of fluid is less than prescribed, then the lubricant or seal clearance is sufficiently low to pass the valve. If the accumulation in the prescribed period of time is greater than that desired for the valve tested, then it is rejected and may be refitted with a larger plug so that it may pass the limited restriction flow through its sealing clearance that is normally occupied by the valve lubricant. Valves of this character must not leak to the exterior regardless of their minimum clearance factor. Testing of the valve body prior to introducing lubricant or chemical seal insures the detection of minute porosity leaks through the metal which otherwise may remain undetected since the lubricant or chemical seal may temporarily prevent the passage of the fluid through the defective metal. Thus the valves may be submerged at the same time to test for exterior leakage at the time they are being tested for minimum seal clearance and to these ends this invention is directed.

The principal object of this invention is the provision of a combined fluid and electrical system that automatically checks the seal clearance within the valve and at the same time an external leakage from the valve is under test. This test may be made completely automatic by supplying a conveyor to insert the valves in turn and drop those that are good in one bin and those that are bad in the next and any valve that was mistakenly carried over would of course be rechecked. The conveyor holds the valve in position until an electric eye circuit closes the switch starting the test by closing the valve in a fluid circuit to check the sealing clearance flow and at the same time flood water over the valve to check for leaks noted by any bubbling in the water surrounding the valve. If after a predetermined period of time the accumulation has not been enough to reject the valve the timer reverses the switch to retract the water and remove the valve in this sequence. The valve is then discharged to a passing bin. If the valve is rejected the water is immediately retracted, the valve released and the valve set for discharge from the conveyor in a rejected bin.

Other objects and advantages of this invention appear hereinafter in the following description and claims.

The accompanying drawing shows for the purpose of exemplification without limiting the claims thereto a practical embodiment illustrating the principles of this invention wherein the diagrammatic showing of the pneumatic and electrical circuits illustrate this invention.

Referring to the drawing the valve 1 is positioned at the testing station 2 within the tank 3 and supported by the conveyor 4 that descends to the stand 5 and returns the valve after the test. The test station 2 has a stationary tube 6 with a soft rubber faced flange 7 against which one end of the valve 1 is forced by the ram or movable head 8 also having a soft rubber faced flange 10. The head 8 is on the rod 11 attached to the piston 12 in the double acting fluid actuated cylinder 13 to move the head 8 until the soft face of the flange 10 engages the other end of the valve 1 and forcing it in sealed relation against the flange 7. These opposed flanges 7 and 10 have central openings that align with the passageways in the valve casing. The valve being closed and being of the lubricated type without any lubricant therein provides a seal clearance between the plug and body which is like an orifice of fixed dimension and must be checked or measured to determine whether or not this clearance is greater or less than a predetermined amount. If greater it must be refitted, if less it is passed.

The tank 3 has the bottom 14 in which there is an opening 15 to the cylinder 16 containing the piston 17, the rod 18 of which is connected to the rod 20 of the piston 21 in the double acting cylinder 22. When cylinder 22 is energized to move the piston 17 to the left, the water in the cylinder 16 is forced through the passageway 15 and floods around the submerged valve 1 and any air under pressure therein that could leak would bubble through the water and thus indicate that the valve cannot pass inspection since these valves must have no leakage to the exterior regardless of the seal clearance between the plug and the body. When the test is completed the cylinder 22 is energized to retract the piston 17 and thus withdraw the water from around the valve 1.

A source of air under pressure at approximately 180 pounds per square inch is connected to the supply pipe 23 which leads to two valves 24 and 25. The first valve 24 admits air through the pipe 26 to the four way valve 27 shown in its off position and when swung clockwise will connect line 26 to line 28 to supply air pressure to move the piston 12 and the head 8 to seal the valve 1 between the aligned rubber faced flanges 7 and 10. If the four way valve 27 is swung counterclockwise air under pressure is supplied to the other side of the piston 12 to retract the flange 10. The side of the piston 12 opposite to that receiving pressure is connected to exhaust line 30 by the valve 27.

Valve 25 when opened supplies air under pressure through line 31, air filter 32, line 33, electrically operated valve 34, and line 35 to the valve 1 through the flange 7. Since there is no lubricant in the closed valve 1 this air leaks through this sealing clearance normally occupied by the lubricant and escapes through the flange 10, the head 8 and by the line 36 through the filter 37, the line 38, the electrically operated valve 40, the line 41, the line 42, the line 43 to the accumulating chamber 44. This chamber 44 may be exhausted to the exhaust line 30 through the line 45 and the valve 46. Line 43 is also connected with the pressure switch 47 and by the electrically operated valve 48 and thence to exhaust line 30. Pressure gauges 50 are also provided in lines 33, 36 and 43.

Line 31 also supplies air under pressure to the air control unit 51, line 52 to the servomotor control 53 that has two valves to connect the air under pressure through the lines 54 and 55 to the opposite ends of the servomotor 22 that actuates the water piston 17.

The electrical circuit is connected to a suitable source of supply such as 110 volt A.C. supply line and protected by the circuit breaker 56. To simplify the circuit it is shown feeding through the lines 57 and 58 to the center poles of the double pole double throw switch 59.

These lines also connect with the pressure actuated member 47, the line 57 being connected to the red and green lights, the opposite sides of which are connected by this pressure device to the line 58 to energize the selected light depending upon whether there is a high or low accumulation of pressure in the chamber 44 after the passage of a predetermined period of time determined by the timer 60 which is energized when the switch 59 is thrown left to energize through the lines 57 and 58, the electric solenoid valve 34 to open the same and pass air to the valve 1 and at the same time energize 53 to supply air through the line 54 and flood the tank 3 with water. The timer 60 has a heel contact 61 connected to line 57 and its front contact 62 connects current through line 63 to open the electromagnetic valve 40 to permit the air to pass through the valve 1 to the accumulator. After a predetermined length of time the timer 60 opens its contact to deenergize valve 40 and stop any further flow of air to the tank 44. If this is below a predetermined pressure the green light stays on. If at the end of the timer period the air accumulated is greater than a predetermined amount the red light goes on showing the valve has too much seal clearance and needs refitting. The test in any event is over and the switch 59 is thrown in the opposite direction to retract the water from the tank 3 by energizing the other side of the fourway control valve 53 and also to energize the electrically operated valve 48 to discharge the accumulator tank 44 which also throws the valve 27 to retract the head 8 and release the valve 1 from test.

I claim:

1. The method of checking the lubricant clearance between valve plugs and valve bodies to match the same which comprises seating a clean plug in its closed position in a clean valve body, applying sealed fluid connections to the ports of the valve body, applying fluid under predetermined pressure to one valve port connection to pass the same through the lubricant clearance between the valve plug and valve body, collecting and accumulating the fluid having passed through the lubricant clearance from another valve port connection, isolating the accumulated flow of fluid under pressure after a predetermined period of time, and measuring the accumulated fluid to determine the degree of orifice equivalent to the lubricant clearance.

2. The method of claim 1 which also includes the step of simultaneously submerging the assembled valve body and plug when passing fluid under pressure through the lubricant clearance to determine external leakage between the plug and the valve body.

3. The method of claim 1 which also includes the steps of indicating and selectively pairing the plugs and valve bodies in accordance with the degree of their orifice equivalent of their lubricant clearance.

4. The method of matching lubricated valve plugs and bodies comprising, seating a clean plug in its closed position in a clean valve body, applying sealed fluid connections to the ports of the valve body, applying fluid under predetermined pressure to one valve port connection to pass the same through the lubricant clearance between the valve plug and valve body, collecting and accumulating the fluid having passed through the lubricant clearance from another valve port connection, isolating the accumulated flow of fluid under pressure after a predetermined period of time, measuring the accumulated fluid to determine the degree of orifice equivalent to the lubricant clearance, and matching the valve plugs and valve bodies that provide a measured lubricant clearance within predetermined limits of accumulated fluid under pressure.

5. A machine for measuring the lubricant clearance of a dry valve plug set in closed position in a dry valve body, comprising a sealed fluid port connection closing each valve body port, control means to supply fluid under predetermined pressure to one port connection, a closed system accumulator connected to another port connection for receiving the fluid under pressure having passed through the lubricant clearance of the closed valve, timer means to isolate the fluid under pressure in the accumulator after a predetermined period of time, and signal means connected with said accumulator and actuated by the fluid under pressure after having passed through the lubricant clearance of the closed valve to selectively indicate whether the lubricant clearance is acceptable or rejectable.

6. A machine for measuring the lubricant clearance of a dry valve plug set in closed position in a dry valve body, comprising, a sealed fluid port connection closing each valve body port, control means connected to one port connection to supply fluid under predetermined pressure to said closed valve, a closed system accumulator connected to another port connection for receiving the fluid under pressure having passed through the lubricant clearance of the closed valve, and signal means connected with said accumulator and actuated by the fluid under pressure after having passed through the lubricant clearance of the closed valve after a predetermined period of time to selectively indicate whether the lubricant clearance is acceptable or rejectable.

7. The lubricant clearance measuring machine for lubricant plug valves as set forth in claim 6 characterized in that said signal means includes a timer and a valve controlled thereby to isolate said accumulator after a predetermined period of time.

8. The lubricant clearance measuring machine for lubricant plug valves as set forth in claim 6 characterized in that said signal means includes a fluid pressure actuated switch connected to energize circuits indicating low and high values of accumulated fluid under pressure in said accumulator indicating acceptable and rejectable lubricant clearance in the closed valve.

9. The lubricant clearance measuring machine for lubricant plug valves as set forth in claim 6 characterized by a tank in which said closed valve is disposed, a displacement flooding means to fill said tank with liquid and submerge said lubricant plug valve when said flooding means is actuated in one direction and to withdraw liquid from the tank when said flooding means is actuated in the opposite direction to simultaneously test the lubricated plug valve for external leaks.

10. The lubricant clearance measuring machine for lubricant plug valves as set forth in claim 9 characterized by a servomotor to operate said flooding means, a fluid valve to control the supply of fluid under pressure to said lubricant plug valve, and means common to said servomotor and to said fluid valve to operate them simultaneously.

11. A machine for measuring the lubricant clearance of a dry valve plug set in closed position in a dry valve body, comprising, a sealed fluid port connection closing each valve body port, a tank in which said closed valve is disposed, a displacement flooding means to fill said tank with liquid and submerge said lubricant plug valve when said flooding means is actuated in one direction and to withdraw liquid from the tank when said flooding means is actuated in the opposite direction to simultaneously test the lubricant plug valve for external leaks, a servomotor to operate said flooding means, control means connected to one port connection to supply fluid under predetermined pressure to said closed valve, said control means including a fluid valve to control the supply of fluid under pressure to said lubricant plug valve, a closed system accumulator connected to another port connection for receiving the fluid under pressure having passed through the lubricant clearance of the closed valve, means common to said servomotor and to said fluid valve to operate them simultaneously, and signal means connected with said accumulator and actuated by the fluid under pressure after having passed through the lubricant clearance of the closed valve after a predetermined period of time to selectively indicate whether the lubricant clearance is acceptable or rejectable, said fluid valve and the control of said servomotor are electrically operated and said means common to both is a switch connected to energize both simultaneously.

12. The lubricated clearance measuring machine for lubricant plug valves as set forth in claim 11 characterized by an electrically actuated valve to control the discharge of fluid under pressure from said accumulator, switch means to simultaneously energize said servomotor and said electrically actuated valve to simultaneously discharge said tank of liquid and said accumulator of fluid under pressure.

References Cited in the file of this patent
UNITED STATES PATENTS

| | | |
|---|---|---|
| 277,756 | Lunkenheimer | May 15, 1883 |
| 1,101,932 | Hooker | June 30, 1914 |
| 1,554,637 | McKee | Sept. 22, 1925 |
| 1,684,014 | Dudley | Sept. 11, 1928 |
| 2,200,310 | Thayer et al. | May 14, 1940 |
| 2,433,043 | Gray | Dec. 23, 1947 |
| 2,450,535 | Kopischiansky | Jan. 18, 1949 |
| 2,472,973 | Hoffman et al. | June 14, 1949 |
| 2,853,874 | Mennesson | Sept. 30, 1958 |